Jan. 26, 1960 — H. SHAPIRO — 2,922,620
ROTOR STAGE CONSTRUCTION
Filed March 13, 1956 — 2 Sheets-Sheet 2
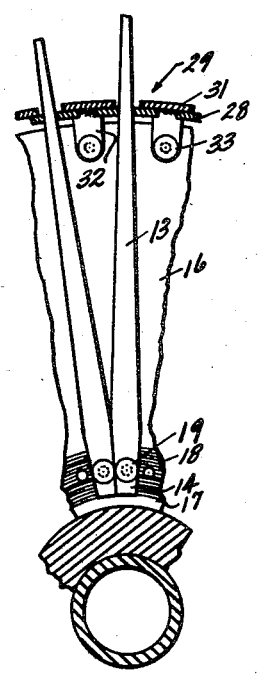
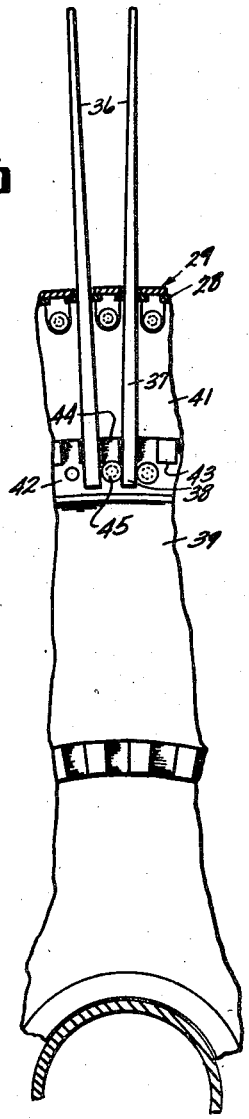
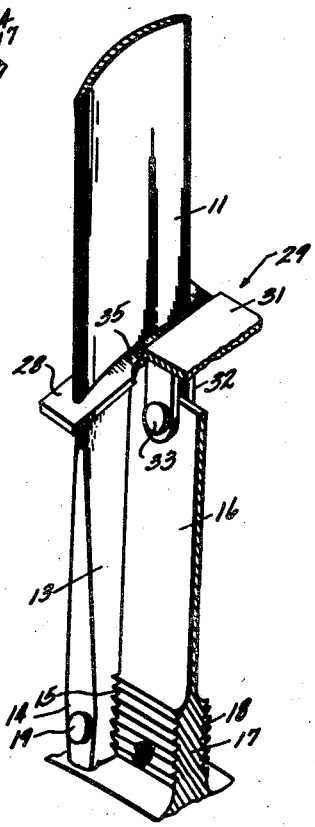
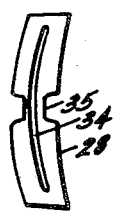
INVENTOR.
HENRY SHAPIRO
BY
THEIR ATTORNEY United States Patent Office 2,922,620
Patented Jan. 26, 1960

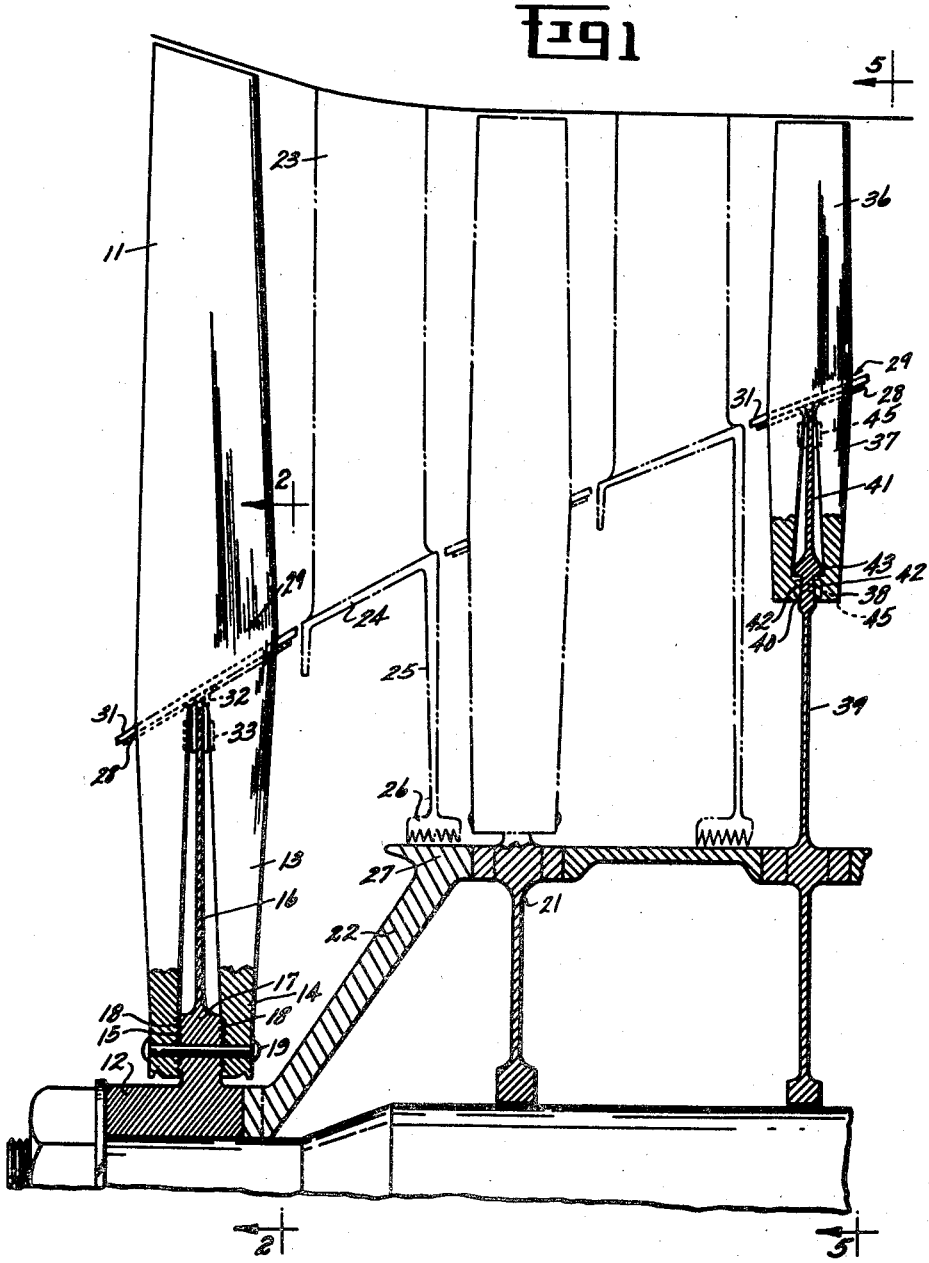

2,922,620

ROTOR STAGE CONSTRUCTION

Henry Shapiro, Los Angeles, Calif., assignor to General Electric Company, a corporation of New York Application March 13, 1956, Serial No. 571,349

4 Claims. (Cl. 253—77)

The present invention relates to a rotor stage construction and more particularly to a rotor stage construction for lightweight axial flow compressors and turbines.

The use of conventional blade root anchoring means in lightweight rotor constructions embodying flexible shank blades has presented difficulties in the past due to the problem encountered in providing adequate interstage and interblade seals and at the same time ensuring proper vibration damping of the blades. The manufacture and assembly of these seals have been expensive and time consuming processes because of the relatively large number of parts involved and the machining operations required to maintain the close tolerances necessary in the connections between the parts. These and other disadvantages have been overcome in the present invention by the provision of a unique rotor stage construction which permits greatly simplified interstage and interblade seal assemblies with provision for mechanically damping blade vibration.

The present invention provides a rotor stage construction which requires a minimum number of parts and which does not necessitate the use of precise connections between the parts. These results are achieved by using a single sealing disk to seal the spaces between adjacent rotor stages, and small spacers mounted on the disk in cooperation with vibration dampers and conventional stator blade shrouds to seal the spaces between the blades.

An object of the present invention is the provision of an improved rotor stage construction for lightweight axial flow compressors and turbines.

Another object is the provision of simplified interstage and interblade sealing for lightweight rotors embodying flexible shank blades.

A further object is the provision of convenient and simple means of installing an effective blade vibration damper.

Other objects and many of the attendant advantages of this invention will be readily appreciated as the same becomes better understood by reference to the following detailed description when considered in connection with the accompanying drawings wherein:

Fig. 1 is a partial elevation view of the early stages of an axial flow compressor embodying the present invention;

Fig. 2 is a fragmentary view partly in section taken along lines 2—2 of Fig. 1;

Fig. 3 is a perspective view showing the manner of attachment of the various parts of the rotor of Fig. 1;

Fig. 4 is a plan view at an enlarged scale of a vibration damper utilized in the present invention; and Fig. 5 is a fragmentary view of a modified construction taken along lines 5—5 of Fig. 1.

Referring more particularly to Fig. 1 of the drawing the first stage of rotor blades includes a flexible shank blade 11 mounted on a wheel 12. The blade 11 includes an elongated bifurcated shank section 13 and blade root sections 14 at the inner extremity of the shank section. The inside edges of the root sections are each provided with inwardly extending ridges 15. The wheel 12 includes a thin rim section 16 which is introduced into the bifurcated shank of the blade. An enlarged retaining section 17 is formed at the inboard edge of the rim section and projects laterally from the opposite faces of the wheel. The opposite sides of the retaining section are formed with a plurality of grooves 18 into which the ridges 15 of the blade root sections are introduced. A rivet or pin 19 is passed through the enlarged retaining section and the blade root sections and secures the blade to the wheel. The wheel 21 of the second stage of rotor blades is connected to wheel 12 by a section 22 of the torque tube. The stage of stator blades between the two stages of rotor blades includes the stator blade 23 and an annular shroud 24 affixed to the inner end thereof. The shroud 24 includes an annular extension 25 which supports an annular seal 26 in sealing engagement with platform 27 on torque tube section 22.

As shown in Fig. 2 a vibration damper washer 28 is fitted on each blade and is positioned just above the edge of the rim section. The edges of the washer project laterally from the blade towards the corresponding edges of the adjacent washer. Gas path spacers 29 are positioned about the periphery of the rim section in alternating fashion with the blades, such that each blade is separated from every adjacent blade by a spacer. As shown in Fig. 3 each gas path spacer includes a shelf 31 and a pair of tangs 32 which depend from the lower surface thereof. Each spacer is provided with the shelf overlying the opposed edges of adjacent damper washers and is retained in position by means of a pin 33 passed through the tangs 32 and the rim section. The damper washer, as shown in Fig. 4 comprises a relatively thin plate which is slotted longitudinally as at 34 to receive the air foil section of the blade and is indented or cut out along its lateral edges as at 35 to clear the tangs 32 of the adjacent gas path spacers.

Referring again to Fig. 1 a modified construction is illustrated as including the blade 36 secured to the wheel 39. The blade includes elongated bifurcated shank section 37 terminating in root sections 38 having inturned projections 40, the inner edges of which are tapered convergently towards the shank. The wheel 39 includes the rim section 41 which is introduced into the bifurcated shank section and a radially convergent retaining section 42 at the inner edge of the rim section. As shown in Fig. 5 the outer portion of the retaining section is segmented and includes pairs of oppositely projecting shoulders 43 alternating with spaces 44. The projections 40 of the root section of each blade are positioned radially inboard of a pair of shoulders 43 and are retained in position by means of pins 45 passed through the rim section in the spaces 44.

In the operation of the present invention the blade 11 is mounted on the wheel 12 by spreading the bifurcated shank 13 and sliding it over the rim section so that the shank straddles the rim section and the blade root sections bear against the opposite faces of the retaining section with the ridges 15 received in the grooves 18. The rivet 19 is then passed through the retaining section and both portions of the blade root and the opposite ends thereof turned over to retain it in position. Since the rim section 16 extends the full length of the shank of each blade in the stage it forms a continuous interstage seal which prevents the circulation of working fluid through the shanks in either direction. The gas path spacers 29 are inserted between adjacent blades so that the tangs 32 straddle the periphery of the rim section. The spacers are then attached to the rim section by means of the pins 33. The damper washers 28 are loosely positioned on the blades and are free to move longitudinally of the blades under the effects of centrifugal force. When the rotor is in operation the damper washers are thrown outwardly by centrifugal force and bear against the under surfaces of the overlapping spacers. The friction between the overlapping surfaces damps the vibrational movement of the blades. Since the amount of friction between the surfaces varies with the rotational speed of the rotor, the damping force imparted to the blades varies likewise in the direct relation to the rotor speed. The gas path spacers in conjunction with the damper washers form the inner boundary of the gas path across the stage of rotor blades and direct the flow of working fluid to the following stage of stator blades. The shroud 24 defines the inner boundary of the gas path across the stator stage and directs the working fluid to the following rotor stage. There will be small amounts of leakage of the working fluid over the circumference of the rim section and through the gaps between the spacers and the shrouds, however, the annular member 25, the seal 26 and the platform 27 combine to prevent leakage through the stator stage to the next rotor stage.

In the embodiment of Fig. 5, the rim section is introduced into the bifurcated shank of the blades until the projections 40 slide through a pair of the spaces 44. The blade is then moved circumferentially of the wheel until the projections are positioned radially inboard of a pair of the shoulders 43. The blade is then locked in this position by inserting of a pin 45 through the wheel to close the space 44. The inner edges of the projections and the portion of the retaining section below the shoulders are tapered to retain the blades in position on the wheel when the rotor is not in motion. The interstage and interblade seals in this embodiment are the same as in the embodiment of Fig. 2.

In the wheel construction illustrated the rim section is integral with the remainder of the wheel, however, it is contemplated that in certain instances it may be desirable to form the rim section separately and to attach it to the remainder of the wheel by means of welding or similar attachment processes.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed is:

1. A rotor stage construction for axial flow compressors and turbines comprising: a rotor wheel having a thin rim section, and an enlarged retaining section formed on the wheel at the inner edge of the rim section; a plurality of blades each including an elongated bifurcated shank section and root sections at the extremity thereof, said blades being mounted on the wheel with the bifurcated shank straddling the rim section and the root sections secured to the retaining section; and a plurality of gas path spacers pivotally mounted on the rim section in alternate fashion with said blades, each spacer including a shelf which spans the distance between adjacent blades.

2. A rotor stage construction for lightweight axial flow compressors and turbines comprising: a rotor wheel having a thin rim section, and a retaining section at the inner edge of the rim section; a plurality of blades each including an elongated bifurcated shank section and root sections at the extremity thereof, said blades being mounted on the wheel with the bifurcated shank straddling the rim section and the root sections secured to the retaining section; a plurality of gas path spacers pivotally mounted on the rim section in alternating fashion with said blades, each spacer including a shelf which spans the distance between adjacent blades; and a mechanical vibration damper mounted on each blade and positioned under the edges of adjacent gas path spacers.

3. A lightweight rotor stage construction comprising: a rotor wheel having a thin rim section and a retaining section at the inner edge of the rim section; a plurality of blades each including a bifurcated shank section and root sections at the extremity thereof, said blades being mounted on the wheel with the bifurcated shank straddling the rim section and the root sections secured to the retaining section; a vibration damper supported on each of said blades and projecting therefrom toward the next adjacent blade; and a plurality of gas path spacers pivotally mounted on the rim section in alternating fashion with said blades, each spacer including a flat shelf which spans the distance between adjacent blades and overlies the edges of adjacent dampers.

4. A rotor stage construction for lightweight compressors and turbines comprising: a rotor wheel having blade root retaining means formed thereon, and a thin rim section projecting radially from the outer edge of the retaining means; a plurality of blades each including a bifurcated shank section and root sections at the extremity thereof, said blades being mounted on the wheel with the bifurcated shank straddling the rim section and the root sections secured to the retaining means, said rim section extending over the full length of the shank section; a vibration damper supported on each said blade and projecting therefrom towards the next adjacent blade; and a plurality of gas path spacers mounted on the rim section in alternating fashion with said blades, each spacer including a shelf which spans the distance between adjacent blades and overlies the adjacent edges of the associated vibration dampers.

References Cited in the file of this patent

UNITED STATES PATENTS 2,751,189    Ledwith _____ June 19, 1956

FOREIGN PATENTS 724,281    Great Britain _____ Feb. 16, 1955